United States Patent
Lobo Ribeiro et al.

(10) Patent No.: US 8,089,688 B2
(45) Date of Patent: Jan. 3, 2012

(54) BROADBAND NEODYMIUM-YTTERBIUM-SILICA DOPED AMPLIFIED SPONTANEOUS EMISSION OPTICAL FIBER SOURCE BY SPECTRAL FILTERED REINJECTED SIGNALS

(75) Inventors: António B. Lobo Ribeiro, Maia (PT); Irina Trifanov, Maia (PT); Miguel Alexandre Ramos De Melo, Gondomar (PT); Martin Ole Berendt, Árvore (PT); José António Ribera Salcedo, Oporto (PT); Rosa M. Muniz, Oporto (PT)

(73) Assignee: Multiwave Photonics SA (PT)

( * ) Notice: Subject to any disclaimer, the term of this patent is extended or adjusted under 35 U.S.C. 154(b) by 415 days.

(21) Appl. No.: 12/482,670

(22) Filed: Jun. 11, 2009

(65) Prior Publication Data

US 2010/0315700 A1    Dec. 16, 2010

(51) Int. Cl.
*H01S 3/23* (2006.01)
*H01S 3/067* (2006.01)
(52) U.S. Cl. ...................................... 359/333
(58) Field of Classification Search .............. 359/333, 359/341.5
See application file for complete search history.

(56) References Cited

U.S. PATENT DOCUMENTS

| | | | |
|---|---|---|---|
| 4,637,025 A * | 1/1987 | Snitzer et al. ............... 372/1 |
| 4,938,556 A | 7/1990 | Digonnet et al. |
| 5,659,644 A * | 8/1997 | DiGiovanni et al. ........... 385/31 |
| 5,867,305 A * | 2/1999 | Waarts et al. ............ 359/337.12 |
| 6,151,338 A * | 11/2000 | Grubb et al. ................. 372/6 |
| 6,195,200 B1 * | 2/2001 | DeMarco et al. ......... 359/337.21 |
| 6,363,194 B1 * | 3/2002 | DiGiovanni et al. ......... 385/123 |
| 6,411,762 B1 * | 6/2002 | Anthon et al. ................. 385/123 |
| 6,529,320 B2 * | 3/2003 | Gregory et al. ............... 359/349 |
| 6,535,331 B2 * | 3/2003 | Shiota et al. ............. 359/341.32 |
| 6,570,701 B1 * | 5/2003 | Hwang et al. .............. 359/341.1 |
| 6,658,189 B2 * | 12/2003 | Ajima et al. .................... 385/123 |
| 6,718,095 B1 | 4/2004 | Gonthier |
| 7,298,547 B1 | 11/2007 | Jiang et al. |
| 7,423,803 B1 | 9/2008 | Chavez-Pirson et al. |
| 7,688,499 B2 * | 3/2010 | Fermann et al. ........... 359/337.5 |
| 2004/0057106 A1 * | 3/2004 | Hwang et al. .............. 359/341.3 |
| 2004/0075889 A1 * | 4/2004 | Shin et al. .................. 359/341.1 |
| 2005/0024716 A1 * | 2/2005 | Nilsson et al. ........... 359/341.31 |
| 2005/0069252 A1 * | 3/2005 | Hwang et al. .................... 385/27 |

(Continued)

OTHER PUBLICATIONS

Y. Yasuno, et al., In vivo high-contrast imaging of deep posterior eye by 1-um swept source optical coherence tomography and scattering optical coherence angiography, Optics Express, May 14, 2007, pp. 6121-6139, vol. 15, No. 10.

(Continued)

*Primary Examiner* — Mark Hellner
*Assistant Examiner* — Ari M Diacou
(74) *Attorney, Agent, or Firm* — San Diego IP Law Group LLP

(57) ABSTRACT

The present invention provides an amplified spontaneous emission fiber optic source having high optical power (>20 mW) and a spectral broadband emission (>70 nm) centered near a wavelength of 1060 nm. In an embodiment of the invention, the fiber source comprises a combination of Yb-doped and Nd-doped silica fibers in a dual-pumping configuration. The Yb-doped optical fiber has a peak absorption coefficient of 350 dB/nm at 977 nm band, and the Nd-doped fiber used has a dopant concentration of 500 ppm-wt in a glass host of aluminum-germano-phospho-silicate. A combination of these two doped-fibers along with optical spectral filtering provides a broadband spectrum giving coherence length <7 μm (in air), which is well suited for optical coherence imaging.

20 Claims, 4 Drawing Sheets

U.S. PATENT DOCUMENTS

| | | | |
|---|---|---|---|
| 2005/0105169 A1* | 5/2005 | Hwang et al. | 359/341.1 |
| 2005/0122573 A1* | 6/2005 | Kim et al. | 359/341.1 |
| 2005/0185256 A1* | 8/2005 | Kim et al. | 359/333 |
| 2008/0030847 A1* | 2/2008 | Murison et al. | 359/341.3 |

OTHER PUBLICATIONS

A. Unterhuber, et al., In vivo retinal optical coherence tomography at 1040 nm—enhanced penetration into the choroid, Optics Express, May 2, 2005, pp. 3252-3258, vol. 13, No. 9.

B. Povazay, et al., Enhanced visualization of choroidal vessels using ultrahigh resolution ophthalmic OCT at 1050 nm, Optics Express, Aug. 25, 2003, pp. 1980-1986, vol. 11, No. 17.

M. Digonnet, et al., Analysis of a 1060-nm Nd:SiO2 Superfluorescent Fiber Laser, Journal of Lightwave Technology, Jul. 1989, pp. 1009-1015, vol. 7, No. 7.

G. Rego, et al., High-Temperature Stability of Long-Period Fiber Gratings Produced Using an Electric Arc, Journal of Lightwave Technology, Oct. 2001, pp. 1574-1579, vol. 19, No. 10.

B. Povazay, et al., Three-dimensional optical coherence tomography at 1050 nm versus 800 nm in retinal pathologies: enhanced performance and choroidal penetration in cataract patients, Journal of Biomedical Optics, Jul./Aug. 2007, pp. 1-7, vol. 12, No. 4.

L. Kou, et al., Refractive indices of water and ice in the 0.65—to 2.5um spectral range, Applied Optics, Jul. 1, 1993, pp. 3531-3540, vol. 32, No. 19.

* cited by examiner

BROADBAND NEODYMIUM-YTTERBIUM-SILICA DOPED AMPLIFIED SPONTANEOUS EMISSION OPTICAL FIBER SOURCE BY SPECTRAL FILTERED REINJECTED SIGNALS

BACKGROUND OF THE INVENTION

1. Field of Invention

This invention relates to optical coherence tomography and more specifically, to an amplified spontaneous emission fiber optic source with high optical power (>20 mW) and a spectral broadband emission (>70 nm) centered near a wavelength of 1060 nm.

2. Description of Related Art

Commercially available retinal ophthalmic optical coherence tomography (OCT) systems operate at a central wavelength of approximately 820 nm due to the relatively low cumulated absorption of the eye tissue at this wavelength. Although the majority of retina imaging reports refer to this band, and ultrahigh resolution has also been demonstrated in this wavelength region for resolving intra-retinal layers, it has limited depth penetration beyond retinal pigment epithelium (RPE). For imaging features beyond the RPE, longer wavelengths are more suitable. See Unterhuber et al., "In vivo retinal optical coherence tomography at 1040 nm-enhanced penetration into the choroids," Optics Express 13(9), pp. 3252-3258 (2005), the disclosure of which is incorporated by reference herein in its entirety. This relates to the fact that the absorption and scattering properties of melanin (the main chromophore in the RPE) tend to decrease with increasing wavelength.

Water absorption, on the other hand, represents a more critical limitation especially when imaging a biological sample because of its high content (~90%) of water. There is, however, a spectral window restricted to a wavelength span of 100 nm (a band from 1 µm-1.1 µm) where the water absorption spectrum exhibits a minimum value. Moreover, the optical power loss due to increased water absorption compared to 800 nm band is compensated by the fact that the corneal maximum permissible exposure for longer wavelengths also increases according to American National Standards Institute (ANSI) and International Electrotechnical Commission (IEC) standards. An additional advantage of optical imaging at 1060 nm wavelength band is the zero dispersion point of water, which eliminates the depth dependent broadening of axial resolution over reasonable depth penetration. See Považay et al., "Enhanced visualization of choroidal vessels using ultrahigh resolution ophthalmic OCT at 1050 nm," Optics Express 11, pp. 1980-1986 (2003), the disclosure of which is incorporated by reference herein in its entirety. Recent development of broadband light sources centered at 1060 nm based on amplified spontaneous emission (ASE) from rare-earth doped fibers made possible the development of OCT systems in this band and have proven successful for three dimensional (3D) in vivo retinal imaging with enhanced performance and penetration. See Považay et al., "Three-dimensional optical coherence tomography at 1050 nm versus 800 nm in retinal pathologies: enhanced performance and choroidal penetration in cataract patients," Journal of Biomedical Optics 12(4), 041211-(1-7) (2007); and Yasuno et al., "In vivo high-contrast imaging of deep posterior eye by 1-µm swept source optical coherence tomography and scattering optical coherence angiography", Optics Express 15(10), pp. 6121-6139 (2007), the disclosures of which are incorporated by reference herein in their entirety. It is predicted that this optical source imaging modality could become a successful alternative to imaging at 820 nm band in early assessments, staging and therapeutic monitoring of retinal diseases.

One prior approach to obtain a broadband spectrum around 1060 nm has been described in U.S. Pat. No. 7,423,803 to Chavez-Pirson et al., the disclosure of which is incorporated by reference herein in its entirety, using a combination of Ytterbium (Yb)-doped fibers only, pumped with a laser diode with the same emission wavelength. This combination relies on the change of the material properties of the co-doping of the fibers. However, their source expands the traditional Yb-doped amplified spontaneous emission (ASE) emission to shorter wavelengths, which will suffer higher optical attenuation due to the 980 nm peak absorption of the water. The valley in the water absorption in centered at ~1060 nm and measures ~100 nm at −3 dB point. At an operating central wavelength lower than 1060 nm, the reduction of the signal due to water absorption is more pronounced and leads to a decrease of penetration depth compared to longer wavelengths. See Kou et al., "Refractive indices of water and ice in the 0.65- to 2.5-µm spectral range," Applied Optics 32(19), pp. 3531-3540 (1993), the disclosure of which is incorporated by reference herein in its entirety.

SUMMARY OF THE INVENTION

The present invention overcomes these and other deficiencies of the prior art by providing an amplified spontaneous emission fiber optic source having high optical power (>20 mW) and a spectral broadband emission (>70 nm) centered near a wavelength of 1060 nm. The fiber source is based on a combination of single mode Yb-doped and Neodymium (Nd)-doped silica fibers in a dual-pumping configuration. The Yb-doped optical fiber has a peak absorption coefficient of 350 dB/m at a wavelength of 977 nm, and the Nd-doped fiber has a peak absorption band of 25 dB/m at a wavelength of 805 nm, the latter having a dopant concentration of 500 ppm-wt in a glass host of aluminum-germano-phospho-silicate. A combination of these two doped-fibers along with optical reinjected spectral filtering provides a broadband spectrum having a coherence length <7 µm (in air), which is well suited for optical coherence imaging.

In an embodiment of the invention, an amplified spontaneous emission fiber optic source comprises: a single mode Yb-doped fiber, a single mode Nd-doped fiber, a first pump source having a wavelength of 975 nm for pumping the single mode Yb-doped fiber, a second pump source having a wavelength of 808 nm for pumping the single mode Nd-doped fiber, and a coupler comprising a first input port and a second input port, the first input port receiving radiation emitted from the single mode Yb-doped fiber and the second input port receiving radiation emitted from the single mode Nd-doped fiber, and the coupler outputting a spectral broadband emission centered near a wavelength of 1060 nm. The spectral broadband emission has an optical power greater than 20 mW. The coupler has a 30/70 coupling ratio between the first input port and the second input port, respectively. The amplified spontaneous emission fiber optic source further comprises a first spectral filter coupled to the single mode Yb-doped fiber and a second spectral filter coupled to the single mode Nd-doped fiber. The first spectral filter comprises a Yb-doped single mode fiber of 0.70 to 0.75 meters in length and has one peak absorption coefficient of ~1010 dB/m at wavelength of 977 nm and another of 23 dB/m at a wavelength of 1047 nm, and the second spectral filter comprises a long-period fiber grating filter, which are both positioned in a double-pass backward amplified spontaneous emission configuration. The amplified spontaneous emission fiber optic source further comprises a first Faraday rotator mirror and a second Faraday rotator mirror, the first Faraday rotator mirror coupled to the first spectral filter and the second Faraday rotator coupled to the second spectral filter. The single mode Yb-doped fiber has a length between 5 to 6 meters. The single mode Nd-doped fiber has a length between 4.5 to 5.5 meters. The amplified spontaneous emission fiber optic source can be implemented in an optical coherence imaging system.

In another embodiment of the invention, a method comprises the steps of: pumping a single mode Yb-doped fiber at a first wavelength to generate a first amplified spontaneous emission, pumping a single mode Nd-doped fiber at a second wavelength to generate a second amplified spontaneous emission, the second wavelength being less than the first wavelength, and combining the first amplified spontaneous emission and the second amplified spontaneous emission to produce a spectral broadband emission centered near a wavelength of 1060 nm. The first wavelength is equal to 975 nm. The second wavelength is equal to 808 nm. The method further comprises the steps of: spectrally filtering the first amplified spontaneous emission using a double-pass backward amplified spontaneous emission configuration, and spectrally filtering the second amplified spontaneous emission using a double-pass backward amplified spontaneous emission configuration. The step of combining the first amplified spontaneous emission and the second amplified spontaneous emission comprises combining the first amplified spontaneous emission with the second amplified spontaneous emission in an uneven coupling ratio. The uneven coupling ratio is a 30/70 ratio. The spectral broadband emission has an optical power greater than 20 mW. The single mode Yb-doped fiber has a length between 5 to 6 meters. The single mode Nd-doped fiber each has a length between 4.5 to 5.5 meters. The method may further comprise the step of acquiring an optical coherence tomography image.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
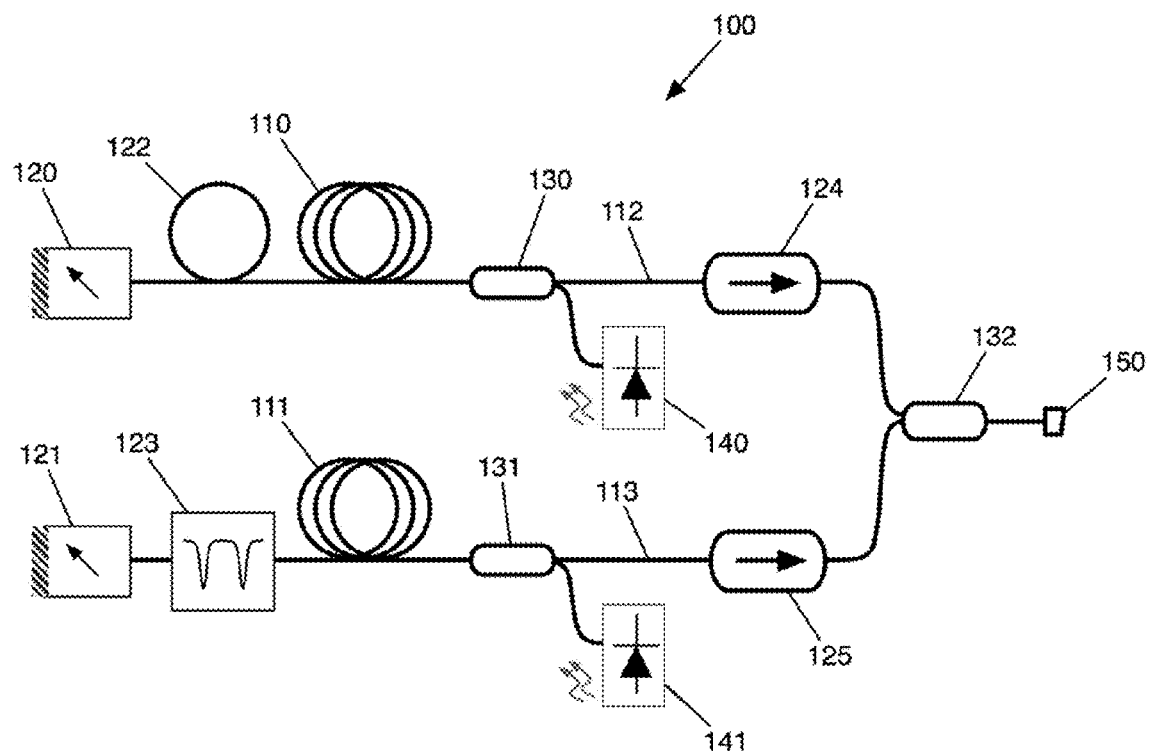
FIG. 1 illustrates a combined Nd—Yb doped ASE fiber source according to an embodiment of the invention.

Further features and advantages of the invention, as well as the structure and operation of various embodiments of the invention, are described in detail below with reference to the accompanying FIGS. 1-4, wherein like reference numerals refer to like elements. Although the fiber source is described in the context of optical coherence tomography, one of ordinary skill in the art readily appreciates that the present invention can be implemented in any type of system where it is desired to implement an ASE fiber source with a wavelength emission centered at 1060 nm.

The present invention provides a high power broadband ASE fiber source with wavelength emission centered at 1060 nm. This ASE fiber source is formed by a combination of Nd-doped silica glass fiber and Yb-doped silica glass fiber. This approach is based on the superfluorescence from Ytterbium-doped and Neodymium-doped silica fibers properly combined and pumped by laser diode sources at different wavelengths. Yb-doped silica fibers have a broad emission spectrum spanning from a wavelength of 1 μm to 1.15 μm, when optically pumped around 980 nm. However, when designing the optical source configuration, care should be taken, because the achieved spectral bandwidth is usually different from the range in which the ASE is observed.

A good candidate for broadening the spectrum of Ytterbium, especially towards longer wavelengths, is a Nd-doped silica fiber that provides both single and double-pass ASE operating on the 4F3/2→4I11/2 transition at 1060 nm with a relatively broad emission. See Digonnet et al., "Analysis of a 1060-nm Nd:SiO$_2$ superfluorescent fiber laser," J. Lightwave Technology 7, pp. 1009-1015 (1989), the disclosure of which is incorporated by reference herein in its entirety. Thus, by a proper combination of Yb-doped and Nd-doped silica fibers with tailored lengths and pumped with laser diodes at 975 nm and 808 nm, respectively, and by adding custom spectral filters that provides re-injection of the signal that is then converted to longer wavelengths, a broadband spectrum with high average optical output power is achieved.

FIG. 1 illustrates an ASE fiber source 100 according to an embodiment of the invention. Particularly, ASE fiber source 100 comprises a length of single mode Yd-doped fiber 110 (having a peak absorption coefficient of 350 dB/m at 977 nm wavelength), which is spliced at one end to a pump coupler 130 and spliced at the other end to a spectral fiber filter 122, which comprises 0.70 to 0.75 meters in length of single mode Yb-doped fiber having one peak absorption coefficient of ~1010 dB/m at a wavelength of 977 nm and another of 23 dB/m at a wavelength of 1047 nm. The pump coupler 130 comprises a thin-film 980/1080 wavelength division multiplexer (WDM) or a fused fiber coupler, the implementation of which are known to one of ordinary skill in the art. The spectral fiber filter 122 is spliced to a Faraday rotator mirror (FRM) 120. The pump coupler 130 is also coupled to a single mode fiber 112, which is coupled to an isolator 124. In an exemplary embodiment of the invention, the single mode Yd-doped fiber 110 is 5 to 6 meters in length.

The ASE fiber source 100 further comprises a length of single mode Nd-doped fiber 111, which is spliced at one end to a pump coupler 131 and spliced at the other end to a spectral filter 123. The pump coupler 130 comprises a thin-film 810/1060 WDM or a fused fiber coupler. The spectral filter 123 comprises a long-period fiber grating filter (LPG), the implementation of which is apparent to one of ordinary skill in the art. The spectral filter 123 is also spliced to a Faraday rotator mirror (FRM) 121. The spectral filter 123 can be fabricated using an electric arc-discharged writing technique, the implementation of which is apparent to one of ordinary skill in the art. See G. Rego et al. "High temperature stability of long-period fiber gratings produced using an electric arc," Journal of Lightwave and Technology, vol. 19, no. 10, pp. 1574-1579 (2001), the disclosure of which is incorporated by reference herein its entirety. The pump coupler 131 is also connected to a single mode fiber 113, which is coupled to an isolator 125. In an exemplary embodiment of the invention, the single mode Nd-doped fiber 111 is 4.5 to 5.5 meters in length with a dopant concentration of 500 ppm-wt in a glass host of aluminum-germano-phospho-silicate and has a peak absorption coefficient of 25 dB/m at a wavelength of 805 nm.

An output coupler 132 is provided with two input ports, one of which is coupled to the isolator 124 and the other of which is coupled to the isolator 125. In an exemplary embodiment of the invention, the output coupler has a coupling ratio of 30/70, i.e., 30% of its output is provided by the radiation emitted from the isolator 124 (and hence the single mode Yb-doped fiber 110) and the other 70% of its output is provided by the radiation emitted from the isolator 125 (and hence the single mode Nd-doped fiber 111). The 30/70 coupling ratio was selected for balancing the optical powers from both isolators 124 and 125. The output port of the output coupler 132 is spliced to a fiber connector 50, which may comprise an angle flat connector (AFC) or angle polished connector (APC), the implementation of which are apparent to one of ordinary skill in the art.

The ASE fiber source 100 further comprises a pump source 140 and a pump source 141. The pump source 140 is preferably a pump laser diode having an emission wavelength of 975 nm in single mode or multimode, and emits a pump signal that is coupled to the input fiber port of the pump coupler 130 and propagates into the Yb-doped fiber 110, where it is absorbed by and excites the ytterbium dopant ions in the fiber core to generate spontaneous emission. The amplified spontaneous emission is emitted in both directions of the Yb-doped fiber 110 length, one of which is spectral filtered by the fiber filter 122 and reflected back by the faraday rotator mirror 120, increasing the ASE backward emission that propagates in the direction of the fiber isolator 124.

The second pump source 141 is preferably a pump laser diode having an emission wavelength of 808 nm in single mode or multimode, and emits a pump signal that is coupled to the input fiber port of the pump coupler 131, and propagates into the Nd-doped fiber 11, where it is absorbed by and excites the neodymium dopant ions in the fiber core to generate spontaneous emission. The amplified spontaneous emission is emitted in both directions of the Nd-doped fiber 111 length, one of which is spectral filtered by the filter 123 and reflected back by the faraday rotator mirror 121, increasing the ASE backward emission that propagates in the direction of the fiber isolator 125.

The two emitted ASE signals, one from the Yb-doped fiber 110 and the other from the Nd-doped fiber 111 sections are combined at the output coupler 132 with an uneven coupling ratio, such as 30/70 coupling ratio in order to achieve a broader bandwidth, that is higher than 70 nm at full width half maximum (FWHM). The two pumps sources 140 and 141 may be adjusted through their injection electrical current, which will result in an adjustment of their corresponding emitting optical power, to obtain the optimum output power for the highest spectral bandwidth at the fiber connector 150 of the combined ASE source 110.

The physical position of the spectral filters 122 and 123 between the Faraday rotator mirrors 120 and 121 is important in allowing a re-injection of the ASE signal which is then converted to longer wavelengths, expanding the available emission bandwidth without compromising any available optical power. In an embodiment of the invention, both spectral filters 122 and 123 are inserted in a double-pass backward ASE configuration, the implementation of which is apparent to one of ordinary skill in the art, thereby causing a redistribution of the optical power from the dominant band to the other spectral ranges without compromising any available power.

Figure 2:
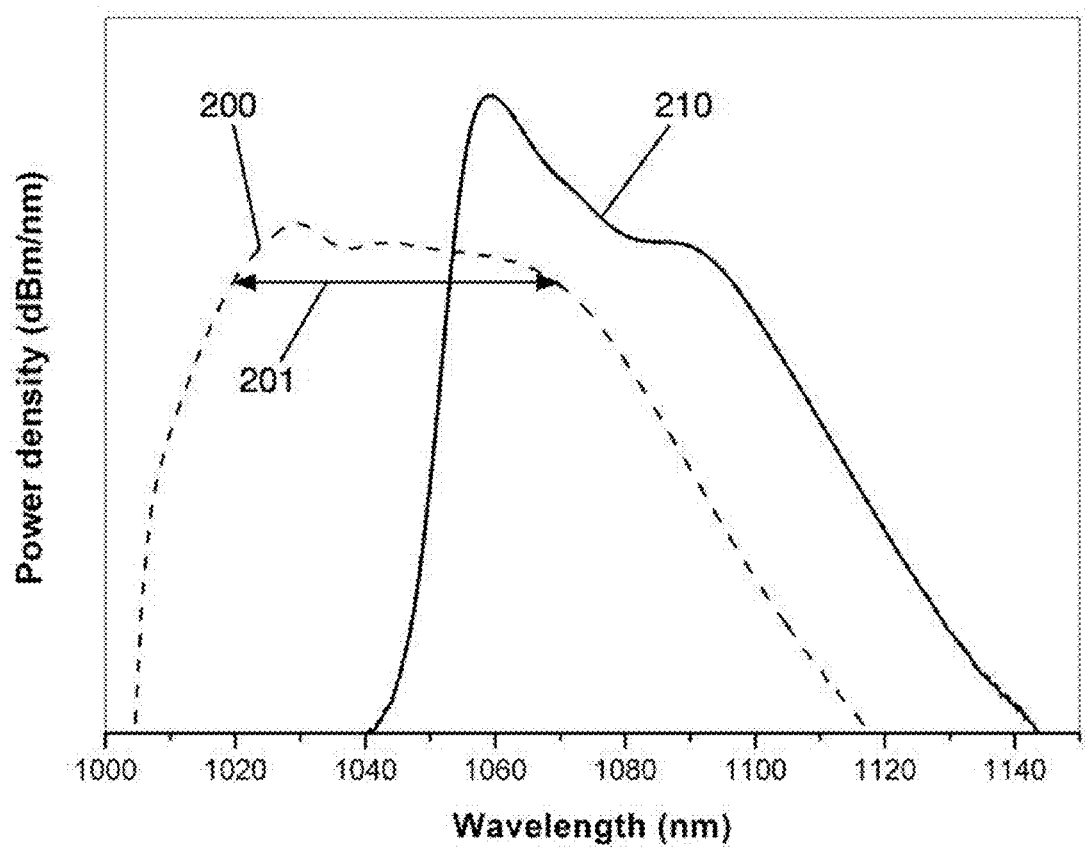
FIG. 2 illustrates the emission spectrums of the Yb-doped fiber and the Nd-doped fiber in the ASE fiber source of FIG. 1.

FIG. 2 illustrates the emission spectrums of the Yb-doped fiber 110 and the Nd-doped fiber 111. The emission spectrum 200 of the Yb-doped fiber gain section at the output of the fiber isolator 124 (and without the spectral filter 122) is shown as a dashed line. This emission spectrum 200 is centered at a wavelength of approximately 1047 nm and has a FWHM bandwidth 201 of about 50 nm, which by itself can only provide a coherence length of approximately 10 μm in air. By comparison, the emission spectrum 210 of the Nd-doped fiber gain section at the output of the fiber isolator 125 (and without the spectral filter 123) is illustrated by a solid line that shows an asymmetrical emission towards longer wavelengths, but with a short FWHM bandwidth (~10 nm).

By combining the two emitted ASE spectra 200 (for the Yb-doped gain) and 210 (for the Nd-doped gain) at the output coupler 132 with an uneven coupling ratio, such as a 30/70 coupling ratio, and spectrally shaping both emissions with the spectral filters 122 and 123, a combined ASE output with broader bandwidth higher than 70 nm at FWHM is achieved. Again, the power of the two pump sources 140 and 141 are preferably adjusted by controlling their injected electrical currents to obtain the highest output power with the spectrally broadest bandwidth possible for the ASE fiber source 100.

Figure 3:
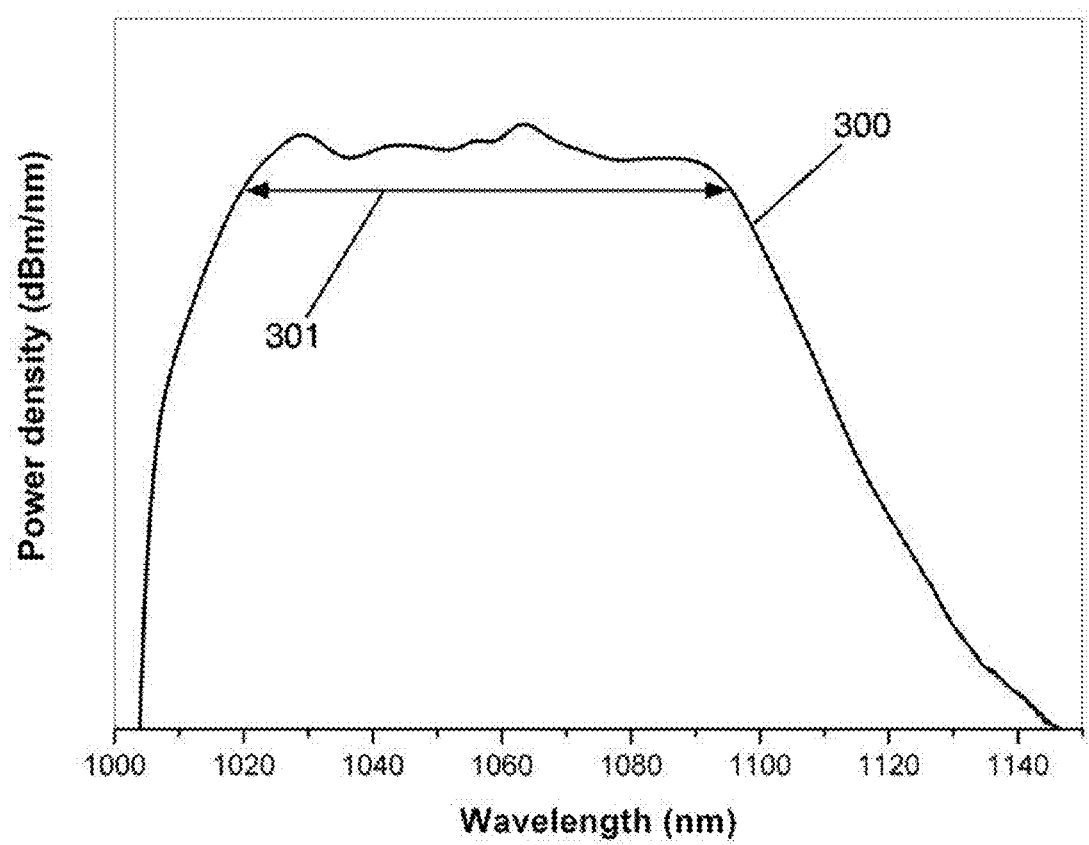
FIG. 3 illustrates an emission spectrum generated by the ASE fiber source of FIG. 1.

FIG. 3 illustrates an emission spectrum 300 generated by the ASE fiber source 100 according to an embodiment of the invention. The emission spectrum 300 has a FWHM spectral bandwidth 301 higher than 70 nm and a coherence length less than 7 μm (in air), well suited for optical coherence imaging, with a total output power higher than 20 mW.

Figure 4:
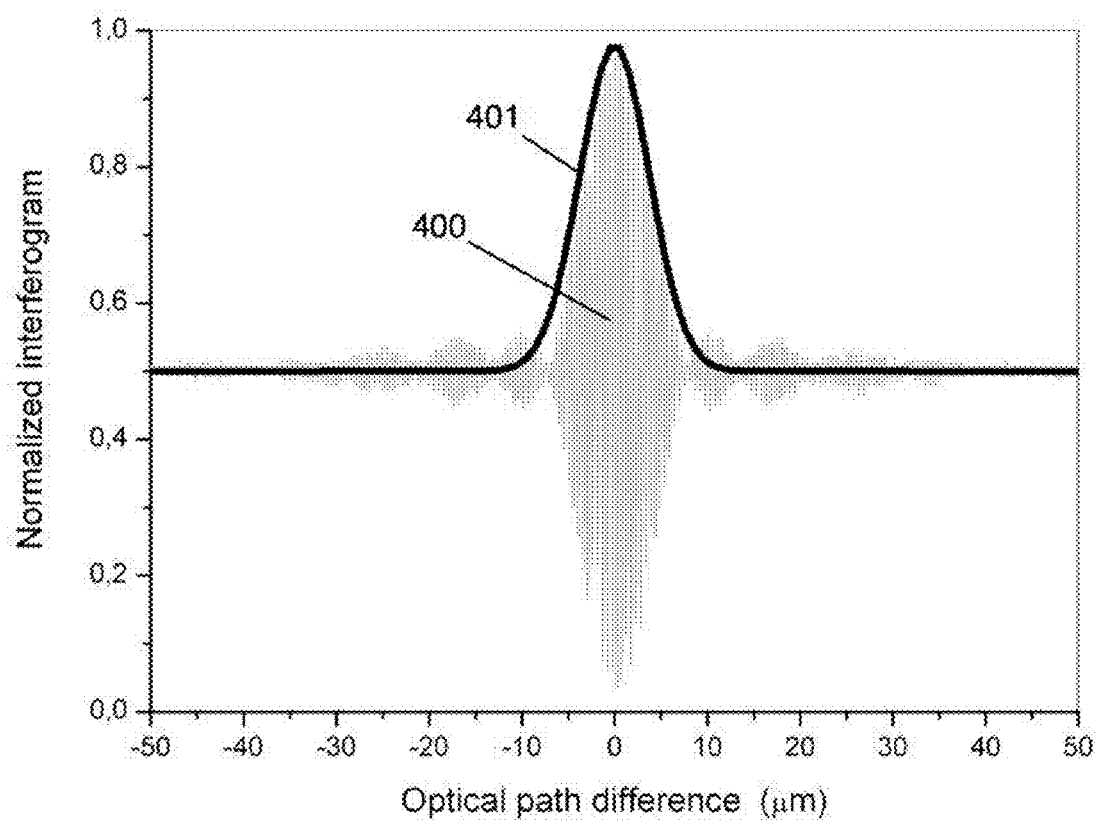
FIG. 4 illustrates a normalized autocorrelation function of the combined Nd—Yb doped ASE source emission spectrum of FIG. 3.

FIG. 4 illustrates a normalized autocorrelation function 400 of the combined Nd—Yb doped ASE source emission spectrum 300 where it shows a coherence length (FWHM) of approximately 7 μm in air from the Gaussian fitting envelope curve 401.

All the fibers disclosed herein except the doped fibers are undoped single mode silica fiber such as, but not limited to Corning HI1060 fibers.

The first and second pump sources 140 and 141 having respective emission wavelengths of 975 nm and 808 nm are the currently best known pump sources for achieving a broadband emission at 1060 nm. One of ordinary skill in the art readily appreciates that pump sources having different emission wavelengths may be implemented in the embodiments described above to achieve a different resulting broadband emission at the output coupler 132. One of ordinary skill in the art readily also appreciates that different fibers (i.e., those other than the single mode Yd-doped fiber 110 and the Nd-doped fiber 111) may actually benefit from different pumping wavelengths.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An amplified spontaneous emission fiber optic source comprising:
   a single mode Yb-doped fiber,
   a single mode Nd-doped fiber,
   a first pump source having a first wavelength for pumping the single mode Yb-doped fiber,
   a second pump source having a second wavelength for pumping the single mode Nd-doped fiber, and
   a coupler comprising a first input port and a second input port, the first input port receiving radiation emitted from the single mode Yb-doped fiber and the second input port receiving radiation emitted from the single mode Nd-doped fiber, and the coupler outputting a spectral broadband emission centered near a wavelength of 1060 nm.

2. The amplified spontaneous emission fiber optic source of claim 1, the spectral broadband emission having an optical power greater than 20 mW and a spectral bandwidth at FWHM greater than 70 nm.

3. The amplified spontaneous emission fiber optic source of claim 1, the coupler having a 30/70 coupling ratio between the first input port and the second input port, respectively.

4. The amplified spontaneous emission fiber optic source of claim 1, further comprising a first spectral filter coupled to the single mode Yb-doped fiber and a second spectral filter coupled to the single mode Nd-doped fiber.

5. The amplified spontaneous emission fiber optic source of claim 4, the first spectral filter comprises 0.70 to 0.75 meters in length of single mode Yb-doped fiber having one peak absorption coefficient of ~1010 dB/m at a wavelength of 977 nm and another peak absorption coefficient of 23 dB/m at a wavelength of 1047 nm and the second spectral filter comprises a long-period fiber grating filter.

6. The amplified spontaneous emission fiber optic source of claim 4, the first spectral filter and the second spectral filter each being positioned in a double-pass backward amplified spontaneous emission configuration.

7. The amplified spontaneous emission fiber optic source of claim 4, further comprising a first Faraday rotator mirror and a second Faraday rotator mirror, the first Faraday rotator mirror coupled to the first spectral filter and the second Faraday rotator coupled to the second spectral filter.

8. The amplified spontaneous emission fiber optic source of claim 1, the single mode Yb-doped fiber having a length between 5 to 6 meters, and the single mode Nd-doped fiber having a length between 4.5 to 5.5 meters.

9. The amplified spontaneous emission fiber optic source of claim 1, the first wavelength is equal to 975 nm and the second wavelength is equal to 808 nm.

10. An optical coherence imaging system comprising the amplified spontaneous emission fiber optic source of claim 1.

11. A method comprising the steps of:
pumping a single mode Yb-doped fiber at a first wavelength to generate a first amplified spontaneous emission,
pumping a single mode Nd-doped fiber at a second wavelength to generate a second amplified spontaneous emission, the second wavelength being less than the first wavelength, and
combining the first amplified spontaneous emission and the second amplified spontaneous emission to produce a spectral broadband emission centered near a wavelength of 1060 nm.

12. The method of claim 11, the first wavelength is equal to 975 nm.

13. The method of claim 11, the second wavelength is equal to 808 nm.

14. The method of claim 11, further comprising the steps of:
spectrally filtering the first amplified spontaneous emission using a double-pass backward amplified spontaneous emission configuration, and
spectrally filtering the second amplified spontaneous emission using a double-pass backward amplified spontaneous emission configuration.

15. The method of claim 11, the step of combining the first amplified spontaneous emission and the second amplified spontaneous emission comprises combining the first amplified spontaneous emission with the second amplified spontaneous emission in an uneven coupling ratio.

16. The method of claim 15, the uneven coupling ratio is a 30/70 ratio.

17. The method of claim 11, the spectral broadband emission having an optical power greater than 20 mW and a spectral bandwidth at FWHM greater than 70 nm.

18. The method of claim 11, the single mode Yb-doped fiber having a length between 5 to 6 meters.

19. The method of claim 11, the single mode Nd-doped fiber having a length between 4.5 to 5.5 meters.

20. The method of claim 11, further comprising the step of acquiring an optical coherence tomography image.

* * * * *